United States Patent
Moore et al.

(10) Patent No.: US 8,389,651 B2
(45) Date of Patent: *Mar. 5, 2013

(54) ELECTRODEPOSITABLE COATING COMPOSITION COMPRISING A NON-SOLUBILIZED ZINC COMPOUND

(75) Inventors: Kelly L. Moore, Dunbar, PA (US); Richard F. Karabin, Ruffs Dale, PA (US); Alan J. Kaylo, Glenshaw, PA (US); Michael J. Pawlik, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 386 days.

This patent is subject to a terminal disclaimer.

(21) Appl. No.: 12/699,930

(22) Filed: Feb. 4, 2010

(65) Prior Publication Data

US 2011/0186440 A1    Aug. 4, 2011

(51) Int. Cl.
    *C08G 59/14*    (2006.01)
(52) U.S. Cl. ................................. 525/523; 523/415
(58) Field of Classification Search ............ 525/523; 523/415

See application file for complete search history.

(56) References Cited

U.S. PATENT DOCUMENTS

| | | | | |
|---|---|---|---|---|
| 5,859,165 | A * | 1/1999 | Bossert et al. | 528/58 |
| 6,881,313 | B2 * | 4/2005 | Yamoto et al. | 204/489 |
| 7,842,762 | B2 * | 11/2010 | Zawacky et al. | 525/523 |
| 2009/0042060 | A1 | 2/2009 | Zawacky et al. | |

* cited by examiner

*Primary Examiner* — Kishor Mayekar
(74) *Attorney, Agent, or Firm* — Diane R. Meyers

(57) ABSTRACT

The present invention is directed to an electrodepositable coating composition comprising a non-solubilized zinc compound in an amount of at least 0.61 weight % based on the total resin solids of the electrodepositable coating composition.

12 Claims, No Drawings

US 8,389,651 B2

ELECTRODEPOSITABLE COATING COMPOSITION COMPRISING A NON-SOLUBILIZED ZINC COMPOUND

BACKGROUND OF THE INVENTION

1. Field of the Invention

The present invention relates to an electrodepositable coating composition.

2. Background Information

One advantage of an electrodeposition coating process is that a coating can be deposited onto a substrate even if the substrate has a complicated shape. Accordingly, the electrodeposition coating process has been used in a variety of industries such as the industrial, automotive, and aerospace industries. In general, the electrodeposition coating process is carried out by immersing a substrate into a tank that contains an electrodepositable coating composition and applying voltage to the substrate thereby coating the substrate with the electrodepositable coating composition. After the electrodepositable coating composition has been applied onto the substrate, the coating composition can be cured using means that are known in the art such as thermal radiation.

SUMMARY OF THE INVENTION

The present invention is directed to an electrodepositable coating composition comprising a non-solubilized zinc compound in an amount of at least 0.61 weight % based on the total resin solids of the electrodepositable coating composition.

The present invention is further directed to an electrodepositable coating composition comprising: a non-solubilized zinc compound in an amount of at least 0.61 weight % based on the total resin solids of the electrodepositable coating composition; a film-forming polymer; and a curing agent that is reactive with the reactive functional group of the film-forming polymer.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "a" non-solubilized zinc compound, "a" film-forming polymer; "a" curing agent, a combination (a plurality) of these components can be used in the present invention.

As used herein, "plurality" means two or more.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight ($M_w$) as determined by Gel Permeation Chromatography.

Unless otherwise indicated, as used herein, "substantially free" means that a composition comprises $\leq 1$ weight percent, such as $\leq 0.8$ weight percent or $\leq 0.5$ weight percent or $\leq 0.05$ weight percent or $\leq 0.005$ weight percent, of a particular material (e.g., organic solvent, filler, etc. . . . ) based on the total weight of the composition.

Unless otherwise indicated, as used herein, "completely free" means that a composition does not comprise a particular material (e.g., organic solvent, filler, etc. . . . ). That is, the composition comprises 0 weight percent of such material.

As used herein, the term "cure" refers to a coating wherein any crosslinkable components of the composition are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form the compound, the compound will comprise the residues of the monomer components.

Electrodepositable Coating Composition

The present invention is directed to an electrodepositable (electrodeposition) coating composition comprising a non-solubilized zinc compound in an amount of at least 0.61 weight % based on the total resin solids of the electrodepositable coating composition. In certain embodiments, the non-solubilized zinc compound is present in an amount of at least 0.72 weight %, such as 0.72 weight % to 1.32 weight %, based on the total resin solids of the electrodepositable coating composition. As used herein, "non-solubilized" means that the compound's aqueous solubility is <0.001 M at 29° C.

The weight percent of non-solubilized zinc compound in the electrodepositable coating composition can be calculated with the following formula:

Grams of elemental zinc in the electrodepositable coating composition/Grams of total resin solids in the electrodepositable coating composition×100%

As stated above, the electrodepositable coating composition of the present invention comprises a non-solubilized zinc compound. Suitable non-solubilized zinc compounds that may be used include, without limitation, zinc oxide, zinc hydroxide, insoluble zinc salts (e.g., zinc phosphate, zinc iron phosphate, zinc manganese phosphate, zinc silicate, zinc aluminate, zinc oxalate), or combinations thereof.

In certain embodiments, the electrodepositable coating composition comprises a film-forming polymer. A wide variety of film-forming polymers can be used so long as the polymers are "water dispersible." As used herein, "water dispersible" means that a material is adapted to be solubilized, dispersed, and/or emulsified in water. Examples of film-forming polymers suitable for use in the present invention, without limitation, polymers derived from a polyepoxide, an acrylic, a polyurethane, a polyester, or combinations thereof. In certain embodiments, the film-forming polymer can comprise functional groups. As used herein, "functional groups" or "reactive functional groups" means hydroxyl, carboxyl, carbamate, epoxy, isocyanate, aceto acetate, amine-salt, mercaptan, or combinations thereof. The film-forming polymers used in the present invention are also ionic in nature. Accordingly, in some embodiments, the film-forming polymer is cationic. In other words, the film-forming polymer comprises cationic salt groups, generally prepared by neutralizing a functional group on the film-forming polymer with an acid, which enables the film-forming polymer to be electrodeposited onto a cathode. For example, in some embodiments, a film-forming cationic polymer can be derived by reacting a polyepoxide containing polymer with a cationic salt group former. As used herein, "cationic salt group former" means a material that is reactive with epoxy groups and which can be acidified before, during, or after reaction with the epoxy groups to form cationic salt groups. Suitable materials that can be used as the cationic salt group former include, without limitation, amines such as primary or secondary amines, which can be acidified after reaction with the epoxy groups to form amine salt groups, or tertiary amines, which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

In certain embodiments, the film-forming polymer that is used in the present invention comprises the reaction product of an epoxy functional compound (e.g., EPON 880 available from Hexion Chemicals) and polyhydric phenol such as a phenolic hydroxyl group-containing material (e.g., bisphenol A). In some embodiments, the film-forming polymer described in the preceding sentence can be reacted with an amine, such as aminopropyldiethanolamine (APDEA) and dimethylaminopropylamine (DMAPA), in order to make the film-forming polymer water dispersible. In certain embodiments, ketimine can be reacted with the backbone of the film-forming polymer thereby forming ketimine arms that extend pendant to the backbone.

The electrodepositable coating composition of the present invention can also comprise a crosslinking agent ("curing agent") that is reactive towards that film-forming resin described in the preceding paragraphs. For example, the film-forming agent may comprise moieties that are reactive with the functional groups of the film-forming polymer. Suitable crosslinking agents that may be used include, without limitation, aminoplasts, polyisocyanates (including blocked isocyanates), polyepoxides, beta-hydroxyalkylamides, polyacids, anhydrides, organometallic acid-functional materials, polyamines, polyamides, cyclic carbonates, siloxanes, or combinations thereof. In some embodiments, the curing agent can comprise from 30 weight % to 40 weight % based on the total resin solids of the electrodepositable coating composition.

In certain embodiments, the electrodepositable coating composition may further comprise a curing catalyst which may be used to catalyze the reaction between the crosslinking agent and the film-forming polymer. While the non-solubilized zinc compound disclosed herein could be considered a curing catalyst, as used herein, "curing catalyst" means a compound, which does not include the non-solubilized zinc compound, which facilitates the curing process between the curing agent and the film-forming polymer. Because the curing catalyst does not include the non-solubilized zinc compound, the non-solubilized zinc compound is different from the curing catalysts disclosed herein. Suitable curing catalysts that may be used in the present invention include, without limitation, organotin compounds (e.g., dibutyltin oxide, dioctyltin oxide) and salts thereof (e.g., dibutyltin diacetate); other metal oxides (e.g., oxides of cerium, zirconium and/or bismuth) and salts thereof (e.g., bismuth sulfamate and/or bismuth lactate), a cyclic guanidine, or combinations thereof.

As stated above, the curing catalyst can be a cyclic guanidine. As used herein, "guanidine" refers to a compound, moiety, and/or residue having the following general structure:

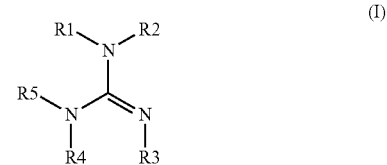

(I)

wherein each of R1, R2, R3, R4, R5 (i.e., substituents of structure (I)) can comprise hydrogen, (cyclo)alkyl, aryl, aromatic, organometallic, a polymeric structure, or together can form a cycloalkyl, aryl, or an aromatic structure, and wherein R1, R2, R3, R4, and R5 can be the same or different. As used herein, "(cyclo)alkyl" refers to both alkyl and cycloalkyl. In some embodiments, two adjacent R groups are connected to form a cyclic moiety, such as the rings in structures (II)-(V) below.

In some embodiments, the double bond between the carbon atom and the nitrogen atom that is depicted in structure (I) may be located between the carbon atom and another nitrogen atom of structure (I). Accordingly, the various substituents of structure (I) may be attached to different nitrogens depending on where the double bond is located within the structure.

In certain embodiments, the cyclic guanidine comprises the guanidine of structure (I) wherein two or more R groups of structure (I) together form one or more rings. In other words, in some embodiments the cyclic guanidine comprises 1 ring. For example, the cyclic guanidine can either be a monocyclic guanidine (1 ring) as depicted in structures (II) and/or (III) below, or the cyclic guanidine can be polycyclic 2 rings) as depicted in structures (IV) and (V) below.

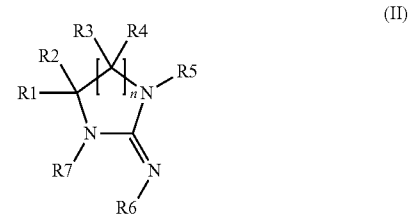

(II)

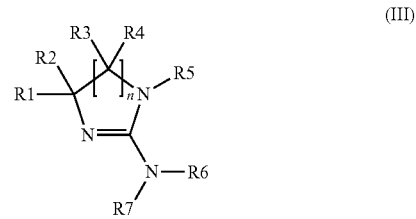

(III)

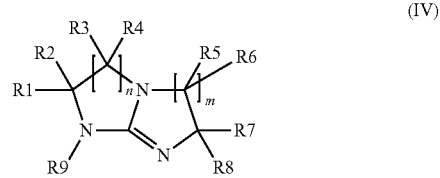

(IV)

-continued

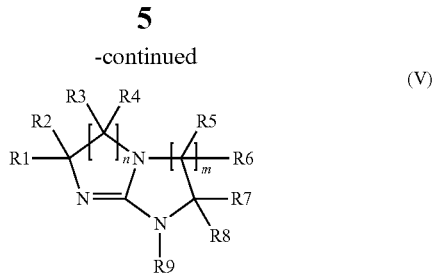

(V)

Each substituent of structures (II) and/or (III), R1-R7, can comprise hydrogen, (cyclo)alkyl, aryl, aromatic, ogranometallic, a polymeric structure, or together can form a cycloalkyl, aryl, or an aromatic structure, and wherein R1-R7 can be the same or different. Similarly, each substituent of structures (IV) and (V), R1-R9, can be hydrogen, alkyl, aryl, aromatic, ogranometallic, a polymeric structure, or together can form a cycloalkyl, aryl, or an aromatic structure, and wherein R1-R9 can be the same or different. Moreover, in some embodiments of structures (II) and/or (III), certain combinations of R1-R7 may be part of the same ring structure. For example, R1 and R7 of structure (II) may form part of a single ring structure. Moreover, in some embodiments, it will be understood that any combination of substituents (R1-R7 of structures (II) and/or (III) as well as R1-R9 of structures (IV) and/or (V)) can be chosen so long as the substituents do not substantially interfere with the catalytic activity of the cyclic guanidine.

In certain embodiments, each ring in the cyclic guanidine is comprised of 5-members. For instance, the cyclic guanidine may be a 5-member ring, a 6-member ring, or a 7-member ring. As used herein, the term "member" refers to an atom located in a ring structure. Accordingly, a 5-member ring will have 5 atoms in the ring structure ("n" and/or "m"=1 in structures (II)-(V)), a 6-member ring will have 6 atoms in the ring structure ("n" and/or "m"=2 in structures (II)-(V)), and a 7-member ring will have 7 atoms in the ring structure ("n" and/or "m"=3 in structures (II)-(V)) It will be appreciated that if the cyclic guanidine is comprised of ≦2 rings (e.g., structures (IV) and (V)), the number of members in each ring of the cyclic guanidine can either be the same or different. For example, one ring may be a five-member ring while the other ring may be a six-member ring. If the cyclic guanidine is comprised of ≦3 rings, then in addition to the combinations cited in the preceding sentence, the number of members in a first ring of the cyclic guanidine can be different from the number of members in any other ring of the cyclic guanidine.

In certain embodiments of the cyclic guanidine the nitrogen atoms of structures (II)-(V) can further have additional atoms attached thereto. Moreover, in some embodiments, the cyclic guanidine can either be substituted or unsubstituted. For example, as used herein in conjunction with the cyclic guanidine, "substituted", in certain embodiments, refers to a cyclic guanidine wherein R5, R6, and/or R7 of structures (II) and/or (III) and/or R9 of structures (IV) and/or (V) is not hydrogen. As used herein in conjunction with the cyclic guanidine, "unsubstituted", in certain embodiments, refers to a cyclic guanidine wherein R1-R7 of structures (II) and/or (III) and/or R1-R9 of structures (IV) and/or (V) is hydrogen. In some embodiments, the substituted cyclic guanidine is 1,5,7-triazabicyclo[4.4.0]dec-5-ene.

The electrodepositable coating composition disclosed herein is typically supplied as two components: (1) a main vehicle ("clear resin feed") and (2) a grind vehicle ("pigment paste"). In general, (1) the main vehicle comprises (a) a film forming polymer ("an active hydrogen-containing ionic salt group-containing resin"), (b) a crosslinking agent, and (c) any additional water-dispersible, non-pigmented components (e.g., catalysts, hindered amine light stabilizers). In general, (2) the grind vehicle comprises (d) one or more pigments (e.g., titanium dioxide, carbon black), (e) a water-dispersible grind resin, which can be the same or different from the film forming polymer, and, optionally, (f) additives such as catalysts, antioxidants, biocides, defoamers, surfactants, wetting agents, dispersing aids, clays, hindered amine light stabilizers, UV light absorbers and stabilizers, or combinations thereof. These two components are then dispersed in an aqueous medium, such as water (which may, optionally, contain coalescing solvents) thereby forming the electrodepositable coating composition. The non-solubilized zinc compound described above may be incorporated into the main vehicle, the grind vehicle, or post-added to the dispersion formed from components (1) and (2).

In certain embodiments, the non-solubilized zinc compound is incorporated into the grind vehicle. If the non-solubilized zinc compound is incorporated into the grind vehicle, then no acid, such as sulfamic, lactic, or acetic, is added into the grind vehicle since the addition of such an acid would solubilize the zinc compound and would, therefore, cause downstream issues (e.g., pin holes) when the electrodepositable coating composition is applied, and cured, onto a substrate.

In certain embodiments, the electrodepositable coating composition disclosed herein comprises a (i) a film-forming component and (ii) a non-film-forming component. In these embodiments, the (i) film-forming component can consists essentially of or consists of: (a) a film-forming polymer; (b) crosslinking agent; (c) a non-solubilized zinc compound, (d) any additional water-dispersible, non-pigmented components (each of these materials (a)-(d) being described in greater detail above) wherein component (c) is present in an amount of at least 0.61 weight % based on the total resin solids of the electrodepositable coating composition. The (ii) non-film-forming component can comprise the materials described in connection with the grind vehicle above.

Unlike other electrodepositable coating compositions that typically cure at temperatures above 320° F. (160° C.), it has been found that, in certain embodiments, low temperature curing (i.e., cure at a temperature <320° F. (160° C.), such as from 284° F. (140° C.) to 311° F. (155° C.), of the electrodepositable coating composition disclosed herein can be achieved.

It also has been found that, in certain embodiments, the electrodeposition baths comprising the electrodepositable coating composition of the present invention can demonstrate bath stability of up to 16 weeks.

Substrate with a Coating System

The electrodepositable coating composition described herein may be applied as part of a coating system that can be deposited onto a number of different substrates. The coating system typically comprises a number of coating layers. A coating layer is typically formed when a coating composition that is deposited onto the substrate is substantially cured by methods known in the art (e.g., by thermal heating). It is noted that the coating composition described above can be used in one or more of the coating layers described in the following paragraphs.

Suitable substrates that can be coated with the coating composition comprising the polymer include, without limitation, metal substrates, metal alloy substrates, and/or substrates that has been metallized, such as nickel plated plastic.

In some embodiments, the metal or metal alloy can be aluminum and/or steel. For example, the steel substrate could be cold rolled steel, electrogalvanized steel, and hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989 or not pretreated with a pretreatment solution.

For clarity, when referring to a "substrate" herein, it should be noted that the substrate may or may not be pretreated.

In certain embodiments, the electrodepositable coating composition of the present invention is applied over a bare (i.e., non-pretreated) substrate. However, in some embodiments, the electrodepositable coating composition of the present invention can be applied to a substrate that has been pretreated. After the electrodepositable coating composition is cured, a primer-surfacer coating composition is applied onto a least a portion of the electrodepositable coating composition. The primer-surfacer coating composition is typically applied to the electrodepositable coating layer and cured prior to a subsequent coating composition being applied over the primer-surfacer coating composition.

The primer-surfacer layer that results from the primer-surfacer coating composition serves to enhance chip resistance of subsequently applied coating layers (e.g., color imparting coating composition and/or substantially clear coating composition) as well as aid in the appearance of the subsequently applied layers. As used herein and in the claims, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482.

It should be noted that in some embodiments, the primer-surfacer coating composition is not used in the coating system. Therefore, a color imparting basecoat coating composition can be applied directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989,642, 6,245,855, 6,387,519, and 7,005,472 can be used in the coating system. In certain embodiments, the substantially clear coating composition can also comprise a particle, such as a silica particle, that is dispersed in the clearcoat coating composition (such as at the surface of the clearcoat coating composition after curing).

One or more of the coating compositions (e.g., the electrodepositable coating composition) described herein can comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in United States Patent Application Publication 2005-0287348, filed Jun. 24, 2004, U.S. Provisional Application No. 60/482, 167 filed Jun. 24, 2003, and U.S. patent application Ser. No. 11/337,062.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/ or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In addition to the materials described above, the coating composition can also comprise an organic solvent. Suitable organic solvents that can be used in the coating composition include any of those listed in the preceding paragraphs as well as butyl acetate, xylene, methyl ethyl ketone, or combinations thereof.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 1K coating can be applied to a substrate and cured by any conventional means, such as by heating, forced air, and the like. The present coatings can also be 2K coatings or multi-component coatings, which will be understood as coating in which various components are maintained separately until just prior to application.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, both coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures $\geq 10°$ C. In other embodiments, the curing operation can be carried out at temperature $\leq 246°$ C. In certain embodiments, the curing operation can carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, the coating compositions described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry (cured) film thickness of the coating layers described herein can range from 0.1 micron to 500 microns. In other embodiments, the dry film thickness can be ≦125 microns, such as ≦80 microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example A

Cationic Resin A: A cationic resin was prepared from a mixture of the following ingredients:

| # | Material | Weight (grams) |
|---|----------|----------------|
| 1 | DER 732[1] | 711.0 |
| 2 | Bisphenol A | 164.5 |
| 3 | Benzyldimethyl amine | 1.65 |
| 4 | Butyl Carbitol formal[3] | 78.8 |
| 5 | Jeffamine D400[2] | 184.7 |
| 6 | Bisphenol A diglicydal ether[4] | 19.1 |
| 7 | Butyl Carbitol formal | 3.4 |
|   | Resins from Reaction product of materials 1-7 | 988.6 |
| 8 | Deionized water | 1242.13 |
| 9 | Sulfamic acid | 30.2 |
| 10 | Deionized water | 614.8 |

[1]Aliphatic epoxy resin available from Dow Chemical Co.
[2]Polyoxypropylene diamine available from Huntsman Corp.
[3]Available as Mazon 1651 from BASF Corporation
[4]Available from Resolution Chemicals as Epon 828

Procedure: 711 g of DER 732[1] and 164.5 grams (g) bisphenol A are charged into a suitably equipped 3-liter round-bottomed flask. The mixture is heated to 130° C. and 1.65 g benzyldimethyl amine is added. The reaction mixture is held at 135° C. until the epoxide equivalent weight of the mixture is 1232. 78.8 g of butyl Carbitol formal[3] is then added and then the mixture is cooled to 95° C. 184.7 g Jeffamine D400[2] is added and the reaction is held at 95° C. until Gardner-Holdt viscosity of a sample of the resin diluted 50/50 in methoxy propanol is "HJ". A mixture of 19.1 g Epon 828[4] and 3.4 g butyl Carbitol formal is added and the mixture is held until the Gardner-Holdt viscosity of a sample of the resin diluted 50/50 in methoxy propanol is "O-". 988.6 g of this resin is poured into a mixture of 1242.13 g deionized water and 30.2 g sulfamic acid and mixed for 30 minutes. 614.8 g of deionized water is then added and mixed well. The final aqueous dispersion had a measured solids content of 35.8%.

Example B

Cationic Paste A: A cationic paste was prepared from a mixture of the following ingredients:

| # | Material | Weight (grams) |
|---|----------|----------------|
| 1 | Cationic Resin from Example A | 1280.0 |
| 2 | Zinc oxide | 163.0 |
| 3 | Deionized water | 20.0 |

Procedure: 1280.0 g of cationic resin from Example A and 163.0 g of Kadox 911, zinc oxide (available from Zinc Corporation of America), are charged to a stainless steel beaker, and dispersed with a high speed cowles blade for 90 minutes at a temperature of 45° C.-50° C. Excess deionized water may be added if the mixture thickens while cowlesing. A recommended portion of deionized water to add is approximately 20.0 g.

Example C

Cationic Paste B: A cationic paste that contains 1.20% zinc was prepared from a mixture of the following ingredients:

| # | Material | Weight (grams) |
|---|----------|----------------|
| 1 | A-W9774-1P5 gray paste[1] | 434.5 |
| 2 | Cationic Paste from Example B | 65.5 |

[1]Catalyst free cationic paste available from PPG Industries, Inc.

Procedure: Items 1 and 2 are combined in a glass beaker and stirred with constant agitation for a minimum of 20 minutes.

Example D

Cationic Paste C: A cationic paste that is 2.00% zinc was prepared from a mixture of the following ingredients:

| # | Material | Weight (grams) |
|---|----------|----------------|
| 1 | A-W9774-1P5 gray paste[1] | 782.0 |
| 2 | Cationic paste from Example B | 218.0 |

[1]Catalyst free cationic paste available from PPG Industries, Inc.

Procedure: Items 1 and 2 are combined in a glass beaker and stirred with constant agitation for a minimum of 20 minutes.

Table 1 shows paste stabilities of Examples B, C, & D in comparison to pastes prepared with soluble zinc (Zn).

TABLE 1

| Paste | Zinc Source | Solubility of Zinc Source[3] (g/100 g H$_2$O) | Initial Viscosity (Ambient) | 16 hours Viscosity (140 F.) |
|-------|-------------|----------------------------------------------|------------------------------|-------------------------------|
| Control 1[1] | ZnCl$_2$ | 432 | >10$^4$ | >10$^4$ |
| Control 2[2] | Zn(NO$_3$)$_2$•6H2O | 184.3 | >10$^4$ | >10$^4$ |
| Example B | ZnO | 0.00016 | 1424 cps | 1252 cps |
| Example C | ZnO | 0.00016 | 842 cps | 1162 cps |
| Example D | ZnO | 0.00016 | 466 cps | 996 cps |

[1]Paste made as described in Example B, except replace zinc oxide with 159.7 g zinc chloride.
[2]Paste made as described in Example B, except replace zinc oxide with 162.2 g zinc nitrate.
[3]CRC Handbook of Chemistry and Physics 60$^{th}$ Edition.

Example E

Paint Formulation A: This example describes the preparation of a cationic electrodeposition coating that is 0.72% zinc on resin solids. The electrodeposition coating was prepared using the following mixture:

| # | Material | Weight (grams) | Resin Solids (grams) | Zinc (grams) |
|---|---|---|---|---|
| 1 | A-W7814-1BO Cationic Resin[1] | 925.0 | 336.2 | 0.0 |
| 2 | Cationic Paste from Example C | 230.0 | 45.1 | 2.76 |
| 3 | Deionized water | 1045.0 | 0.0 | 0.0 |

[1]Cationic epoxy resin available from PPG Industries, Inc.

Procedure: Material 1 was charged in a one gallon container. Half of material 3 is added to the one gallon container. Material 2 is diluted with the remainder of material 3 and added to the one gallon container under agitation. The mixture is allowed to stir for a minimum of one hour. The mixture is then ultrafiltered 20% (remove 440.0 grams of permeate and replace with 440.0 grams of deionized water).

Example F

Paint Formulation B: This example describes the preparation of a cationic electrodeposition coating that is 1.32% zinc on resin solids. The electrodeposition coating was prepared using the following mixture:

| # | Material | Weight (grams) | Resin Solids (grams) | Zinc (grams) |
|---|---|---|---|---|
| 1 | A-W7814-1BO Cationic Resin[1] | 900.0 | 327.2 | 0.0 |
| 2 | Cationic Paste from Example D | 250.0 | 52.0 | 5.00 |
| 3 | Deionized water | 1050.0 | 0.0 | 0.0 |

[1]Cationic epoxy resin available from PPG Industries, Inc.

Procedure: Material 1 was charges in a one gallon container. Half of mixture 3 is added to the one gallon container. Material 2 is diluted with the remainder of material 3 and added to the one gallon container under agitation. The mixture is allowed to stir for a minimum of one hour. The mixture is then ultrafiltered 20% (remove 440.0 grams of permeate and replace with 440.0 grams of deionized water).

Example G

Catalyst Blend A: This example describes the preparation of a catalyst suitable for use in the cationic resin B compositions.

A 500 mL flask was fitted with a steam column, a xylene filled Dean-Stark trap, and a water-cooled condenser, and collection flask. The reaction vessel was purged with nitrogen and was charged with diethylene glycol dibutyl ether (100.0 g), followed by 3,3'-diaminodipropylamine (20.0 g, 0.153 mol). To the stirred solution, propylene carbonate (16.00 g, 0.157 mol) was added and the reaction was allowed to exotherm. After the exotherm, the reaction was heated to 218° C. for 4 hours (h), and then the temperature was increased to 230° C. and held for 48 h. The yield as determined by HPLC was 78.2%.

Example H

Cationic Resin B: This example describes the process of diluting example G for use in the electrodeposition bath compositions of the present invention.

The cationic resin B was prepared with the following ingredients:

| # | Material | Weight (grams) |
|---|---|---|
| 1 | Catalyst Blend from Example G | 207.0 |
| 2 | Dowanol PM | 51.75 |

Procedure: Example G is heated to 140° C. The material is then held at this temperature for one hour. During this time, the meq base of the material is determined by titrating with perchloric acid and a second meq base titration is completed using hydrochloric acid to determine the end point. The heat is turned off, and the solution should be clear. Once the temperature reaches 115° C., approximately 200 g of Example D is poured into a 500 ml pyrex jar containing 51.75 g of Dowanol and stirred.

Example I

Cationic Resin C: This example describes the preparation of a resin that is for use in the electrodeposition bath compositions of the present inventions.

The crosslinker for use in cationic resin C is prepared from the following ingredients:

| # | Material | Weight (grams) |
|---|---|---|
| 1 | Isocyanate[1] | 1876.00 |
| 2 | Dibutyltin dilaurate | 0.35 |
| 3 | Methylisobutyl ketone (mibk) | 21.73 |
| 4 | Diethyleneglycol monobutyl ether | 454.24 |
| 5 | Ethylenegycol monobutyl ether | 1323.62 |
| 6 | Methylisobutyl ketone (mibk) | 269.01 |

[1]Rubinate M, available from Huntsman Corporation

Procedure: Items 1, 2, and 3 are charged to a 4 neck round bottom flask, fit with a stirrer, temperature measuring probe and $N_2$ blanket. Charge 4 is added slowly allowing the temperature to increase to 60° C. The mixture is then held at 60° C. for 30 minutes. Charge 5 is then added over about 120 minutes allowing the temperature to increase to a maximum of 110° C. Charge 6 is then added and the mixture is held at 110° C. until the i.r. spectrum indicates no residual isocyanate.

Cationic resin C is prepared from a mixture of the following ingredients:

| # | Material | Weight (grams) |
|---|---|---|
| 1 | Epon 880 | 614.68 |
| 2 | Bisphenol A | 265.42 |
| 3 | MACOL 98 B | 125.0 |
| 4 | Methyl isobutyl ketone | 31.09 |
| 5 | ethylenephenylphosphonium | 0.60 |
| 6 | MACOL 98 B | 125.0 |
| 7 | Methyl isobutyl ketone | 61.69 |
| 8 | Diketimine | 57.01 |
| 9 | N-methylethanolamine | 30.48 |
| 10 | Cationic resin from Example H | 130.93 |
| 11 | Crosslinker (see above) | 979.4 |
| 12 | Sulfamic acid | 43.42 |

-continued

| # | Material | Weight (grams) |
|---|----------|----------------|
| 13 | Deionized water | 1294.37 |
| 14 | Deionized water | 1758.47 |
| 15 | Deionized water | 1000.0 |

Procedure: 614.68 g of Epon 880 (epoxy resin), 265.42 g of bisphenol A, 125.0 g of Macol 98 B (Bisphenol A-6 ethylene oxide polyol available from BASF Corporation), 31.09 g methyl isobutyl ketone, and 0.60 g ethyltriphenoylphosphonium, are charged to a 2 liter round bottom flask, fit with a stirrer, temperature measuring probe, and $N_2$ blanket. The mixture is heated to 130° C. The heat is then turned off and the mixture is observed for exotherm. The mixture exotherms to approximately 155° C. Once the mixture exotherms, it is held at 145° C. for 90 minutes. Directly after the 145° C. hold, 125.0 g of Macol 98 B is added. 61.69 g of methyl isobutyl ketone is added, the mixture is allowed to cool to 110° C. With the heat still turned off, 57.01 g diketimine, 30.48 g n-methylethanolamine, and 130.93 g Example H are added, and an exotherm is observed. Heat the mixture to 122° C. and hold for 120 minutes. After the 120 minute hold, turn the heat off and add 979.4 g of a blocked isocyanate crosslinker (crosslinker is 160° F. when being added). Mix for 10 minutes. The resin is poured into a mixture of 43.42 g sulfamic acid and 1294.37 deionized water. The mixture is stirred for 30 minutes. 1758.47 g of deionized water is added and mixed in well. 1000 g of deionized water is added and mixed in well. Solvent and water are removed by vacuum distillation, the solids of the resulting aqueous dispersion is relatively 39%.

Example J

Cationic Resin D: This example describes the preparation of a cationic resin used to prepare the pigment paste needed for use in the electrodeposition bath compositions of the present inventions.

A cationic resin was prepared from the following ingredients:

| # | Material | Weight (grams) |
|---|----------|----------------|
| 1 | Epon 828[1] | 533.2 |
| 2 | Nonyl phenol | 19.1 |
| 3 | Bisphenol A | 198.3 |
| 4 | Ethyltriphenyl phosphonium iodide | 0.7 |
| 5 | Butoxy propanol | 99.3 |
|   | Resins from Reaction Products of materials 1-5 | 850.6 |
| 6 | Butoxy propanol | 93.9 |
| 7 | Methoxy propanol | 50.3 |
|   | Resins from Reaction Products of materials 1-7 | 994.8 |
| 8 | Thiodiethanol | 121.3 |
| 9 | Butoxy propanol | 6.9 |
| 10 | Deionized water | 32.1 |
| 11 | Dimethyl propionic acid | 133.1 |
|   | Resins from Reaction Products of materials 1-11 | 1288.2 |
| 12 | Deionized water | 1100.0 |
| 13 | Deionized water | 790.0 |

[1]Diglycidyl ether of Bisphenol A commercially available from Resolution Chemical Co. as Epon 828.

Procedure: Charge materials 1 through 5 to a suitably equipped flask and heat to 125° C. The mixture is allowed to exotherm to 175° C. and then held at 160-165° C. for 60 minutes. After the 60 minute hold add materials 6-7. Cool to 80° C. and add materials 8-11. Hold at 78° C. until the measured acid value is less than 2. When the acid value is OK, pour 1288.2 g of the resin into 1100 g of deionized water with stirring. Mix for 30 minutes, then add material 13 and mix well.

Example K

Pigment Paste A: This example describes the preparation of a pigment paste that is for use in the electrodeposition bath compositions of the present inventions.

The pigment paste A is prepared with the following ingredients:

| # | Material | Weight (grams) |
|---|----------|----------------|
| 1 | Cationic resin from Example J | 10804.6 |
| 2 | Surfynol GA[1] | 26.96 |
| 3 | Carbon Black[2] | 88.97 |
| 4 | Aluminum Silicate Clay[3] | 6511.08 |
| 5 | $TiO_2$ Tronex CR-800E[4] | 829.05 |
| 6 | Deionized H2O | 1609.57 |

[1]Available from Air Products and Chemicals Inc.
[2]Available from Cabot Corporation
[3]Available from Degussa-Huls Corporation
[4]Available from Kerr-McGee Chemical Corporation Procedure: Premix the above materials using a high lift blade for 120 minutes. Grind the premix in a Premier Mill 1.5 HML with the following parameter. 2400 FPM, 1.8-2.6 mm zircoa media, 90° F. temperature, pump speed at 3, flow rate=670 g/min., pump pressure=5.5 lbs while circulating, and pump pressure=3.5 lbs while collecting. The premix is recirculated for 30 minutes until a 7+Hegman is obtained.

Example L

Cationic Resin E: This example describes the preparation of a resin that is for use in the electrodeposition bath compositions of the present inventions.

The cationic resin E is prepared from the following ingredients:

| # | Material | Weight (grams) |
|---|----------|----------------|
| 1 | Epon 828[1] | 614.68 |
| 2 | Bisphenol A | 265.42 |
| 3 | MACOL 98 A MOD 1[2] | 125.00 |
| 4 | Methylisobutyl ketone (mibk) | 31.09 |
| 5 | Ethyltriphenyl phosphonium iodide | 0.60 |
| 6 | MACOL 98 A MOD 1[2] | 125.00 |
| 7 | Methylisobutyl ketone (mibk) | 50.10 |
| 8 | Crosslinker from Example I | 894.95 |
| 9 | Ketimine[3] | 57.01 |
| 10 | N-methyl ethanolamine | 48.68 |
| 11 | Sulfamic acid | 40.52 |
| 12 | Deionized H2O | 1196.9 |
| 13 | Gum rosin solution[4] | 17.92 |
| 14 | Deionized H2O | 1623.3 |
| 15 | Deionized H2O | 1100.0 |

[1]Epoxy resin available from Hexion Specialty Chemicals
[2]Bisphenol ethylene oxide adduct available from BASF Corporation
[3]MIBK diketimine of diethylene triamine at 72.7% in MIBK
[4]30% by weight solution of gum rosin in diethylene glycol mono butyl ether formal Procedure: Items 1, 2, 3, 4, and 5 are charged to a 4 neck round bottom flask, fir with a stirrer, temperature measuring probe, N$_2$ blanket and heated to 130° C. The mixture exotherms to about 150° C. The temperature is allowed to drop to 145° C. and held at this temperature for 120 minutes. Charges 6 and 7 were then added. Charges 8, 9, and 10 were added and the mixture was held at 122° C. for 120 minutes. 1991 g of the reaction mixture is poured into a solution of items 11 and 12 with good stirring. Charge 13 was then added and the resulting dispersion is mixed for 30 minutes and then charge 14 is added with stirring over 30 minutes and mixed well. Charge 15 is added and mixed well. About 1100 g of water and solvent are distilled off under vacuum at 60-65° C. The resulting aqueous dispersion had a solids content of 39.37%.

Example M

Cationic Resin F: This example describes the preparation of a cationic resin that is used in the preparation of the electrodeposition paint composition of the present invention.

The intermediate needed for preparation of cationic resin F is prepared from the following ingredients:

| # | Material | Parts |
|---|---|---|
| 1 | Epon 828[1] | 8940.2 |
| 2 | Bisphenol A-ethylene oxide adduct[2] | 3242.1 |
| 3 | Bisphenol A | 2795.8 |
| 4 | Methyl isobutyl ketone | 781.8 |
| 5 | Tetronic 150R1[3] | 8.1 |
| 6 | Benzyldimethylamine | 12.4 |
| 7 | Bezyldimethylamine | 18.24 |
| 8 | Diketimine[4] | 1623.6 |
| 9 | N-methylethanolamine | 758.7 |
| 10 | Sulfamic acid | 1524.4 |
| 11 | Deionized water | 12561 |
| 12 | Deionized water | 7170.3 |
| 13 | Deionized water | 11267.7 |
| 14 | Deionized water | 8450.7 |

[1]Epoxy resin available from Hexion Specialty Chemicals
[2]A 6 mole ethoxylate of Bisphenol A
[3]Tetronic 150R1 is a nonionic surfactant available from BASF
[4]Diketimine is the reaction product of diethylene triamine and methyl isobutyl ketone at 72.3% solids in methyl isobutyl ketone Procedure: Materials 1-5 were charged into a reaction vessel and heated under nitrogen atmosphere 125° C. Material 6 was added and the reaction was allowed to exotherm to around 180° C. When the reaction reached 160° C., a 60 minutes hold was started. After the peak exotherm, the resin was allowed to cool back to 160° C., continuing the hold. After the hold, the reaction was then cooled to 130° C. and material 7 was added. The reaction was held at 130° C. until an expoliated epoxy equivalent weight of 1070. At the expected epoxy equivalent weight, materials 8 and 9 were added in succession and the mixture was allowed to exotherm to around 150° At the peak exotherm, a 60 minute hold was started while allowing the reaction to cool to 125° C. After the 60 minute hold, the resin was dispersed in an aqueous medium consisting of materials 10 and 11. The dispersion was later reduced with materials 12, 13, and 14. The resulting cationic soap was vacuum striped until the methyl isobutyl ketone content was less than 0.05%.

Cationic resin F was prepared from the following ingredients:

| # | Material | Parts |
|---|---|---|
| 1 | Cationic resin intermediate (see above) | 50.10 |
| 2 | Propylene glycol mono propyl ether | 1.34 |

-continued

| # | Material | Parts |
|---|---|---|
| 3 | Deionized water | 1.47 |
| 4 | Epon 828 solution[1] | 781.8 |
| 5 | Ethylene glycol mono butyl ether | 1.34 |
| 6 | Rhoadameen C5[2] | 1.98 |
| 7 | Deionized water | 0.93 |
| 8 | Deionized water | 4.00 |
| 9 | Deionized water | 14.97 |

[1]85% Epon 828 (Epoxy resin available from Hexion Chemicals) + 15% propylene glycol methyl ether
[2]A surfactant available from Rhodia Chemicals Procedure: Charge material 1 to the reactor. Set temperature to 70° C. and start heating reactor. Add charge 2 and 3 sequentially. Hold until reactor reaches 70° C. Add material 4 to reactor over the next 15 minutes. Add material 5 to the reactor and hold for 45 minutes at 70° C. Heat reactor to 88° C. and hold for 180 minutes. 150 minutes into the hold time, add materials 6 and 7 to the reactor. Turn off head and add material 8. Once reactor has reached 32° C., add material 9 and hold for 60 minutes.

Example N

Cationic Resin G: This example describes the preparation of a cationic resin that is used in the preparation of the electrodeposition paint composition of the present invention.

The cationic resin G is prepared from the following ingredients:

| # | Material | Parts |
|---|---|---|
| 1 | MAZEEN 355 70[1] | 1303.64 |
| 2 | Simusol PG130[2] | 1290.69 |
| 3 | Acetic acid | 16.93 |
| 4 | Dibutyltin dilaurate | 0.14 |
| 5 | Desmodur LS 2096[3] | 462.0 |
| 6 | Sulfamic acid | 79.11 |
| 7 | Deionized water | 898.5 |
| 8 | Deionized water | 567.6 |

[1]Amine functional diol of amine equivalent weight 1156 available from BASF Corporation
[2]Polyproylene glycol of approximate molecular weight 700, available from SEPPIC Inc.
[3]Isocyante, available from Dow Chemical Co.

Procedure: Items 1, 2, 3, and 4 are charged to a 4 neck round bottom flask, fit with a stirrer, temperature measuring probe, and N$_2$ blanket, and mixed for 10 minutes. Item 5 is charged over about 60 minutes allowing reaction mixture to exotherm to a maximum temperature of 80° C. The mixture is held at 80° C. until the infrared spectrum indicates the absence of isocyanate (approximately 60 minutes). 2612 g of the reaction mixture is poured into a mixture of items 6 and 7 and mixed for 60 minutes. Item 8 is then added over 60 minutes and mixed for 60 minutes. The resulting aqueous dispersion had a solids content of about 38%.

Example O

Cationic Resin H: This example describes the preparation of a cationic resin that is used in the preparation of the electrodeposition paint composition of the present invention.

The cationic resin H is prepared as a mixture of the following ingredients:

| # | Material | Parts |
|---|---|---|
| 1 | Butoxyethanol | 31 |
| 2 | Surfynol 104[1] | 31 |
| 3 | Cocoamine ethoxylate[2] | 31 |
| 4 | Acetic acid[3] | 5 |

[1]Surfactant available from Aldrich Chemical
[2]Five moles ethylene oxide/one moles cocoamine
[3]75% acetic acid in deionized water Example P Paint Formulation C: This example describes the preparation of a cationic electrodepositionable coating that contains both zinc and bi-cyclic guanidine. This example is 0.72% zinc on resin solids.

| # | Material | Weight (grams) | Resin Solids (grams) | Zinc (grams) |
|---|---|---|---|---|
| 1 | Cationic resin from Example I | 1322.5 | 592.0 | 0.0 |
| 2 | Cationic resin from Example L | 92.1 | 44.7 | 0.0 |
| 3 | Dowanol PPH | 9.9 | 0.0 | 0.0 |
| 4 | Cationic resin from Example M | 86.2 | 17.9 | 0.0 |
| 5 | Cationic resin from Example N | 64.4 | 26.8 | 0.0 |
| 6 | Cationic resin from Example O | 4.7 | 3.4 | 0.0 |
| 7 | Noramox C5[1] | 3.0 | 3.4 | 0.0 |
| 8 | Pigment paste from Example K | 195.6 | 39.1 | 0.0 |
| 9 | Cationic paste from Example B | 60.0 | 19.2 | 5.44 |
| 10 | DI water | 1503.7 | 0.0 | 0.0 |

[1]Available from Autochem, Inc.

Procedure: Materials 1 and 2 are combined in a one gallon container. A portion of material 10 is added to the container. The mixture is allowed to stir for 10 minutes. Materials 3, 4, 5, 6, and 7 are added sequentially, slowly over 15 minutes, using a portion of material 10 to cut. Material 8 is added, being diluted with a portion of material 10. Material 9 is added, being diluted by the remainder of material 10. The mixture is allowed to stir for a minimum of one hour prior to being ultrafiltered 20% (668.4 g of permeate is removed and replaced with 668.4 g of deionized water).

The data reported in Table 2 illustrates the low cure performance with the addition of cationic pastes from Examples D, E, or F in the electrodeposition baths of the invention.

TABLE 2

| Paint Formulation | Cure Temp (° C.) | Double Acetone Rubs[3] | Coated Panel Appearance | Stability (Ambient Aging)[4] |
|---|---|---|---|---|
| Control[1] (std DBTO paint) | 140° C. | 5 - break to metal | Good | >3 months |
| Control[1] (std DBTO paint) | 155° C. | Significant Mar | Good | >3 months |
| Control[1] (std DBTO paint) | 160° C. | Slight Mar | Good | >3 months |
| Soluble Zn paint[2] | 160° C. | No Mar | Poor | <1 day |
| Example E | 155° C. | No Mar | Good | >1 month |
| Example F | 155° C. | No Mar | Good | >1 month |
| Example P | 140° C. | Slight Mar | Good | >4 months |
| Example P | 150° C. | No Mar | Good | >4 months |

[1]The control paint is available from PPG Industries, Inc. as ED6060CZ.
[2]Soluble zinc was added in the resin as zinc acetate.
[3]Pass = 100+ double acetone rubs with no breakthrough or significant marring of the coating.
[4]Stability = Measured by panel appearance (gassing, pinhole), and amount of residue on an L-shaped coated panel.

What is claimed is:

1. An electrodepositable coating composition comprising:
   (a) a cyclic guanidine; and
   (b) a non-solubilized zinc compound in an amount of at least 0.61 weight % based on the total resin solids of the electrodepositable coating composition.

2. The electrodepositable coating composition according to claim 1, wherein the electrodepositable coating composition comprises a film-forming polymer.

3. The electrodepositable coating composition according to claim 2, wherein the electrodepositable coating composition further comprises a curing agent that is reactive with the film-forming polymer.

4. The electrodepositable coating composition according to claim 1, wherein the cyclic guanidine comprises structures II and/or III:

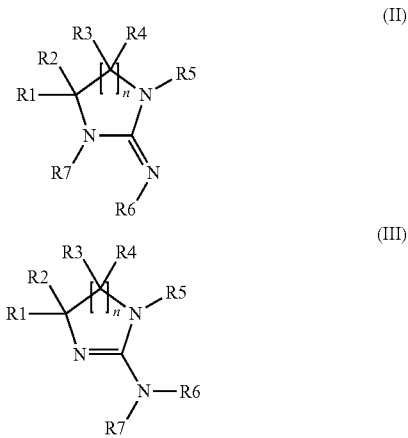

wherein each of R1, R2, R3, R4, R5, R6, R7 comprise hydrogen, (cyclo)alkyl, aryl, aromatic, organometallic, a polymeric structure, or together can form a cycloalkyl, aryl, or an aromatic structure, and wherein R1, R2, R3, R4, R5, R6, and R7 can be the same or different, and wherein n≧1.

5. The electrodepositable coating composition according to claim 1, wherein the cyclic guanidine comprises structures IV and/or V:

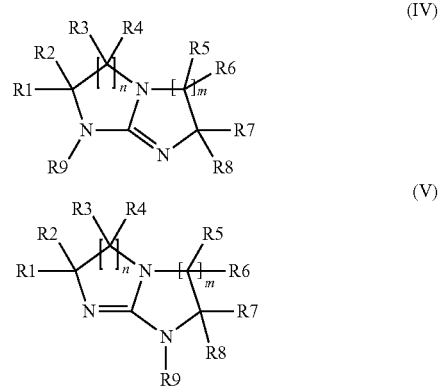

wherein each of R1, R2, R3, R4, R5, R6, R7, R8, or R9 comprises hydrogen, (cyclo)alkyl, aryl, aromatic, organometallic, a polymeric structure, or together can form a cycloalkyl, aryl, or an aromatic structure, and wherein R1, R2, R3, R4, R5, R6, R7, R8, and R9 can be the same or different, and wherein n and m are both ≧1, and wherein n and m may be the same or different.

6. The electrodepositable coating composition according to claim 1, wherein the zinc compound comprises zinc oxide, zinc hydroxide, an insoluble zinc salt, or combinations thereof.

7. The electrodepositable coating composition according to claim 1, wherein after application to a substrate, the electrodepositable coating composition is cured at a temperature of <320° F.

8. An electrodeposition bath comprising the electrodepositable coating composition of claim 1, wherein the electrodepositable coating composition is supplied as: (1) a main vehicle and (2) a grind vehicle comprising the non-solubilized zinc compound.

9. An electrodepositable coating composition comprising:
a non-solubilized zinc compound in an amount of at least 0.61 weight % based on the total resin solids of the electrodepositable coating composition;
a cyclic guanidine;
a film-forming polymer; and
a curing agent that is reactive with the reactive functional group of the film-forming polymer.

10. The electrodepositable coating composition according to claim 9, wherein the cyclic guanidine comprises structures II and/or III:

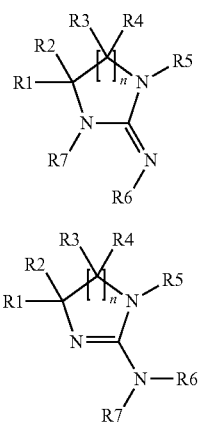

wherein each of R1, R2, R3, R4, R5, R6, R7 comprise hydrogen, (cyclo)alkyl, aryl, aromatic, organometallic, a polymeric structure, or together can form a cycloalkyl, aryl, or an aromatic structure, and wherein R1, R2, R3, R4, R5, R6, and R7 can be the same or different, and wherein n≧1.

11. The electrodepositable coating composition according to claim 9, wherein the cyclic guanidine comprises structures IV and/or V:

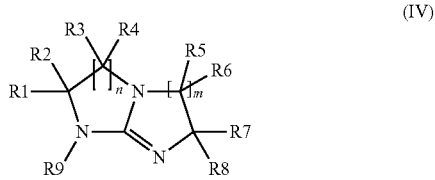

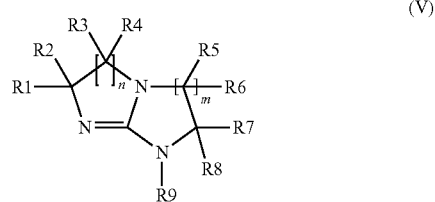

wherein each of R1, R2, R3, R4, R5, R6, R7, R8, or R9 comprises hydrogen, (cyclo)alkyl, aryl, aromatic, organometallic, a polymeric structure, or together can form a cycloalkyl, aryl, or an aromatic structure, and wherein R1, R2, R3, R4, R5, R6, R7, R8, and R9 can be the same or different, and wherein n and m are both ≧1, and wherein n and m may be the same or different.

12. The electrodepositable coating composition of claim 9, wherein the zinc compound comprises zinc oxide, zinc hydroxide, or combinations thereof.

* * * * *